UNITED STATES PATENT OFFICE.

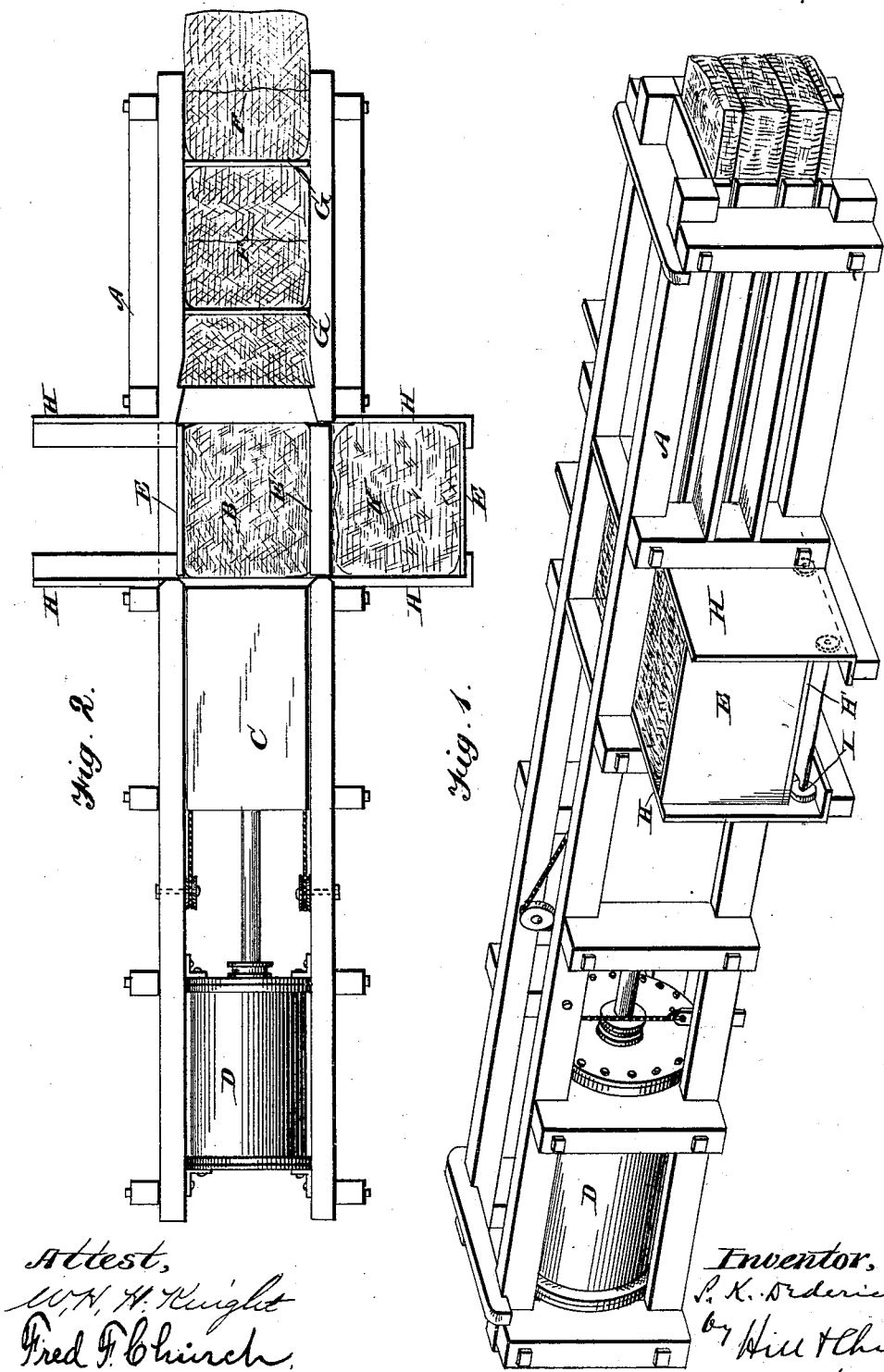

PETER K. DEDERICK, OF ALBANY, NEW YORK.

METHOD OF REDUCING BALES OF FIBROUS MATERIAL.

SPECIFICATION forming part of Letters Patent No. 250,135, dated November 29, 1881.

Application filed October 20, 1881. (No model.)

*To all whom it may concern:*

Be it known that I, PETER K. DEDERICK, of the city and county of Albany, and State of New York, have invented certain Improvements in the Method of Reducing Bales of Fibrous Material, of which the following is a specification.

My invention relates to that class of presses for which Letters Patent were granted me dated October 29, 1872, No. 132,566 and No. 132,639, and for which Letters Patent have since been granted me for various improvements on the same, particularly No. 233,603, October 26, 1880, wherein I have shown a method of reducing lint-cotton into compact bales for transportation, by first pressing the lint into oblong quadrilateral bales, bound the long way, and then reducing them by re-pressing, thus saving a much greater expansion of the pressed packages as compared with the old method. It has been found impracticable to re-press bales of this form in the compress or re-pressing machines in ordinary use, for the reason that the bales bulge out sidewise and double up instead of being condensed.

The object of the present invention, therefore, is to provide a suitable machine for the purpose of re-pressing the bales. I design by the said machine to reduce the bales one-half or two-thirds, as desired, and to bind them again separately, or to bind two or three together into one, as desired. I propose to carry out this operation either in a long bale chamber or tube, as shown in Letters Patent No. 132,639, referred to, or to use a head to the machine, as shown in Patent No. 132,566, referred to, or to retard the bales or columns by any suitable device projected into the chamber in a manner similar to that shown in Letters Patent granted me May 9, 1876, No. 177,218. Either arrangement, separately, or two or more combined, may be employed to carry out the process, bales being used instead of bale-sections.

In the accompanying drawings, Figure 1 is a perspective view of a machine designed to carry out my improved method of re-pressing. Fig. 2 is a plan view, with the top of the press removed.

Similar letters of reference indicate the same parts.

The frame is constructed in any suitable manner or as shown.

A is the bale-chamber; B, the press-box; C, the traverser; D, a hydraulic or steam cylinder. E is a movable receiving-box. F F are finished bales. G G are partition-followers.

The receiving-box is provided with stationary end pieces, H H H H, and is formed with a movable bottom, H', from which project three vertical upright pieces or partitions, E E E, the middle one being thick enough so that when the bottom is moved along to bring one of the compartments or chambers in line with the traverser the other compartment or chamber will be entirely outside of the press. When either compartment or chamber is in line with the traverser the latter can play freely through it.

The movable bottom is preferably mounted on slides or wheels, as shown at I, so that it may be moved easily from side to side of the press to bring the chamber alternately in front of the traverser.

Instead of employing a movable bottom, a stationary bottom might be employed and the bales made to slide upon it, or the two-chamber arrangement might be dispensed with and a movable side to the press used, behind which the bale could be placed and forced in by hand or by automatic mechanism; but in such case great haste would be required or the operation of inserting the bail would be delayed. I prefer, however, to employ the duplicate receiving-chambers shown and described, which may be operated by power or automatic mechanism, if desired.

The discharge end of the press is made adjustable, as also is the end next the receiving-box, or it may be constructed to adjust all four sides, so as to form the greater friction on the bale, and a strap or band may be applied to the center of the chamber to increase the friction. The retaining devices or any of the patented improvements applied and shown in my patents for baling loose material referred to may also be in similar manner applied to this machine, and other power than a steam or hydraulic cylinder may be applied to carry out the process which it is the design of this machine to accomplish.

In operation, a bale is placed in one of the receiving-chambers outside of the machine, and is then moved in line with the bale-chamber, as shown in Fig. 2, B being the bale. The bands may have been previously removed from the bale or not, as desired. The traverser C is then forced forward by the piston, thus condensing the bale and forcing it within the bale-chamber behind the retaining devices. Meantime another bale, K, is placed into the other chamber of the receiving-box, and when the traverser is withdrawn said other bale is in turn moved in line with the bale-chamber and the operation is then continued, each bale in turn being reduced to half or one-third its original size, and then rebound through slots in the sides of the press, shown in Fig. 1, and through the slots in the partition-followers, all in the ordinary manner, as set forth in my continuous press patents above referred to. Each bale may be partitioned off and rebound separately, or two or more bales may be bound into one, as shown by division-lines in F F. The latter I consider the most efficient method. The completed or re-pressed bales are ejected at the other end of the machine, as shown. Of course, the chambers are contracted and expanded to secure the required amount of friction, and the press-box or receiving-box being necessarily larger than the bale-chamber, in order that the latter may receive the bale, it becomes necessary to bevel the mouth of the bale-chamber down to the press-box, as shown.

Most of the essential features of the machinery shown and described in this case are shown in the patents above referred to; hence, without limiting myself to the particular devices shown,

I claim and desire to secure by Letters Patent—

The process or method of re-pressing or reducing bales of hay, cotton, or other loose fibrous material by successively forcing bales of the same into the end of a contracted chamber, rebinding them therein, and ejecting the same from the chamber by introducing additional bales, substantially as described.

PETER K. DEDERICK.

Witnesses:
R. J. VAN SCHOONHOVEN,
W. A. SKINKLE.